US012643827B2

(12) United States Patent (10) Patent No.: US 12,643,827 B2

Sato et al. (45) Date of Patent: Jun. 2, 2026

(54) INORGANIC STRUCTURE AND METHOD FOR PRODUCING SAME

(71) Applicant: Panasonic Intellectual Property Management Co., Ltd., Osaka (JP)

(72) Inventors: Natsuki Sato, Osaka (JP); Ryosuke Sawa, Osaka (JP); Naoki Kurizoe, Osaka (JP); Tatsuro Yoshioka, Osaka (JP); Tohru Sekino, Osaka (JP); Sunghun Cho, Osaka (JP); Tomoyo Goto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 459 days.

(21) Appl. No.: 18/275,793

(22) PCT Filed: Feb. 9, 2022

(86) PCT No.: PCT/JP2022/005031

§ 371 (c)(1),
(2) Date: Aug. 3, 2023

(87) PCT Pub. No.: WO2022/172940

PCT Pub. Date: Aug. 18, 2022

(65) Prior Publication Data

US 2024/0116823 A1    Apr. 11, 2024

(30) Foreign Application Priority Data

Feb. 15, 2021    (JP) .................................. 2021-021639

(51) Int. Cl.
*C04B 35/63*         (2006.01)
*C04B 35/645*       (2006.01)

(52) U.S. Cl.
CPC ........ *C04B 35/6303* (2013.01); *C04B 35/645* (2013.01); *C04B 2235/3217* (2013.01);
(Continued)

(58) Field of Classification Search
CPC ..... B22F 1/16; C04B 35/6303; C04B 35/645; C04B 2235/5454; C04B 2235/80
See application file for complete search history.

(56) References Cited

FOREIGN PATENT DOCUMENTS

JP        2005146315 A   *  6/2005  ............... B22F 1/02
JP        2011-46602 A        3/2011
(Continued)

OTHER PUBLICATIONS

International Search Report for corresponding Application No. PCT/JP2022/005031, mailed Apr. 5, 2022.
(Continued)

*Primary Examiner* — Noah S Wiese
(74) *Attorney, Agent, or Firm* — Renner, Otto, Boisselle & Sklar, LLP

(57) ABSTRACT

Provided is an inorganic structure including a plurality of inorganic particles; and a binding part that covers a surface of each of the plurality of inorganic particles and binds each of the plurality of inorganic particles together. The binding part contains: an amorphous compound containing at least one of aluminum or titanium, oxygen, and one or more metallic elements; and a plurality of fine particles having an average particle size of 100 nm or less. The plurality of inorganic particles has an average particle size of 1 μm or more, and the plurality of inorganic particles has a volume percentage of 30% or more.

13 Claims, 19 Drawing Sheets

(52) U.S. Cl.
CPC ................. *C04B 2235/3232* (2013.01); *C04B 2235/5204* (2013.01); *C04B 2235/5436* (2013.01); *C04B 2235/5454* (2013.01)

(56)                   References Cited

FOREIGN PATENT DOCUMENTS

| | | | |
|---|---|---|---|
| JP | 2012-230948 A | 11/2012 | |
| JP | 2021-230948 A | 11/2012 | |
| KR | 10-2010-0021685 A | 2/2010 | |
| WO | WO-2012146967 A1 * | 11/2012 | ................ B22F 1/16 |

OTHER PUBLICATIONS

Written Opinion for corresponding Application No. PCT/JP2022/005031, mailed Apr. 5, 2022.

* cited by examiner

SEM IMAGE

MAP SUM SPECTRUM

SEM IMAGE

MAP SUM SPECTRUM

Al

Ti

Zr

O

C

FUMED TITANIA RAW MATERIAL

REFERENCE EXAMPLE 3

TiO2 RUTILE

TiO2 ANATASE

◆ RUTILE    ▼ ANATASE

DIFFRACTION ANGLE 2θ (°)

ARBITRARY INTENSITY

ARBITRARY INTENSITY

ARBITRARY INTENSITY

ARBITRARY INTENSITY

2

3, 4

3, 4

2

INORGANIC STRUCTURE AND METHOD FOR PRODUCING SAME

TECHNICAL FIELD

The present invention relates to an inorganic structure and a method for producing the inorganic structure.

BACKGROUND ART

A sintering method is a known method for producing inorganic structures made from ceramics. The sintering method is a method for obtaining a sintered body by heating an aggregate of a solid powder made from an inorganic substance at a temperature lower than the melting point.

Patent Literature 1 discloses a glass powder made from $WO_3$, $TiO_2$, or a solid solution thereof and containing crystals having photocatalytic properties, and further discloses that sintering the glass powder provides a solidified molded product having an arbitrary shape. It is described that such a solidified molded product is useful as photocatalytic functional material having excellent photocatalytic properties.

CITATION LIST

Patent Literature

Patent Literature 1: Japanese Unexamined Patent Application Publication No. 2011-46602

SUMMARY OF THE INVENTION

However, in the sintering method, energy consumption during manufacturing is large and costly because the solid powder needs to be heated at a high temperature. In addition, if only a solid powder is compacted under low temperature conditions, particles of the solid powder are not sufficiently bound to each other, and thus, the obtained molded body has many pores and lacks mechanical strength.

The present invention has been made in consideration of the above issue, which is inherent in the related art. An object of the present invention is to provide an inorganic structure that is prepared through a simple method and has a higher density, and a method for producing the inorganic structure.

In response to the above issue, an inorganic structure according to a first aspect of the present invention includes a plurality of inorganic particles, and a binding part that covers a surface of each of the plurality of inorganic particles and binds each of the plurality of inorganic particles together. The binding part contains: an amorphous compound containing at least one of aluminum or titanium, oxygen, and one or more metallic elements; and a plurality of fine particles having an average particle size of 100 nm or less. The plurality of inorganic particles has an average particle size of 1 μm or more, and the plurality of inorganic particles has a volume percentage of 30% or more.

A method for producing an inorganic structure according to a second aspect of the present invention includes a step for obtaining a mixture by mixing: a plurality of inorganic particles having an average particle size of 1 μm or more, a plurality of fine particles that contains at least one oxide selected from the group consisting of aluminum oxide, titanium oxide, and a complex oxide of aluminum and titanium, and has an average particle size of 100 nm or less; and an aqueous solution containing a metallic element. The above method includes a step for pressurizing and heating the mixture under conditions of a pressure of 10 to 600 MPa and a temperature of 50 to 300° C. The plurality of inorganic particles has a volume percentage of 30% or more in the mixture.

BRIEF DESCRIPTION OF DRAWINGS

FIG. 12 illustrates an XRD pattern of the second alumina powder (fumed alumina) constituting a raw material, an XRD pattern of a test sample of reference example 2, and XRD patterns of γ alumina and η alumina registered in the ICSD.

DETAILED DESCRIPTION OF THE INVENTION

Figure 1:
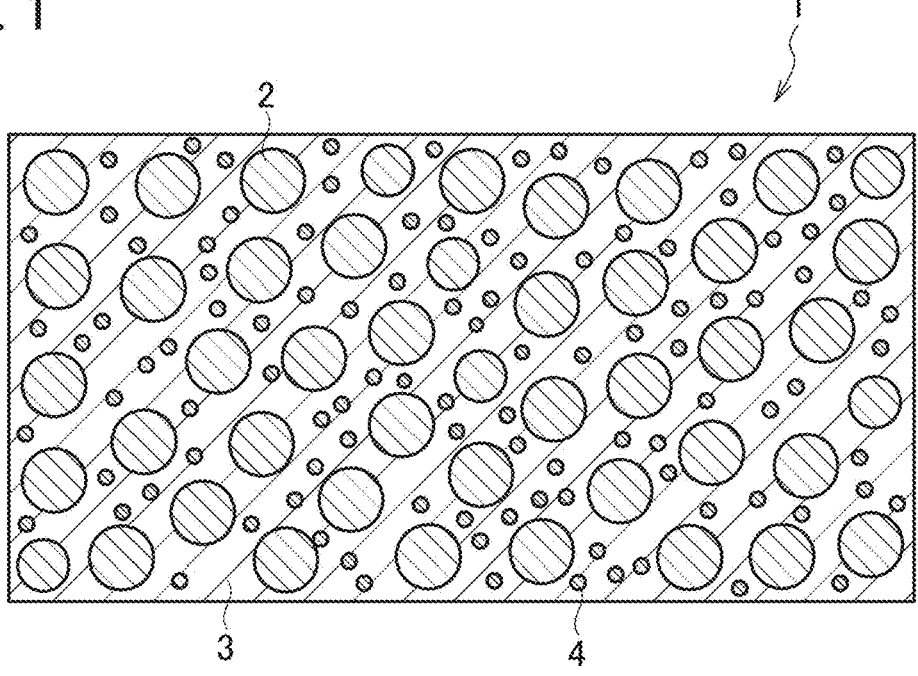
FIG. 1 is a schematic cross-sectional view of an example of an inorganic structure according to the present embodiment.

Referring to the drawings, a detailed description is given below of an inorganic structure and a method for producing the inorganic structure. Note that dimensional ratios in the drawings are exaggerated for convenience of the explanation and are sometimes different from actual ratios.

[Inorganic Structure]

As illustrated in FIG. 1, an inorganic structure 1 according to the present embodiment includes multiple inorganic particles 2 and a binding part 3. Adjacent inorganic particles 2 are bound to each other through the binding part 3 to form the inorganic structure 1, which is an aggregate of the multiple inorganic particles 2.

The inorganic particles 2 are made from an inorganic substance, and the inorganic substance contains at least one metallic element selected from the group consisting of an alkali metal, an alkaline earth metal, a transition metal, a base metal, and a semimetal. In this description, the alkaline earth metal includes beryllium and magnesium in addition to calcium, strontium, barium, and radium. The transition metal includes scandium, titanium, vanadium, chromium, manganese, iron, cobalt, nickel, copper, yttrium, zirconium, niobium, molybdenum, ruthenium, rhodium, palladium, silver, tungsten, platinum, and gold, for example. The base metal includes aluminum, zinc, gallium, cadmium, indium, tin, mercury, thallium, lead, bismuth, and polonium. The semimetal includes boron, silicon, germanium, arsenic, antimony, and tellurium. Among them, the inorganic substance preferably contains aluminum. It is easy for the inorganic particles 2 containing a metallic element described above to bind through the binding part 3 using a pressure heating method as described below.

It is preferable that the inorganic substance constituting the inorganic particles 2 be at least one selected from the group consisting of an oxide, a nitride, a hydroxide, an oxide hydroxide, a sulfide, a boride, a carbide, and a halide of a metallic element described above, for example. Note that the oxide of a metallic element described above may include a phosphate, a silicate, an aluminate, and a borate in addition to compounds in which only oxygen is bound to the metallic element. The inorganic substance constituting the inorganic particles 2 may be a complex anionic compound containing a metallic element described above. The complex anionic compound is a substance in which multiple anions are contained in a single compound, and examples thereof include an acid fluoride, an acid chloride, and an oxynitride. Note that the inorganic substance constituting the inorganic particles 2 is preferably an oxide or a nitride of a metallic element described above. Such an inorganic substance has high stability against oxygen and water vapor in the atmosphere, and thus it is possible to obtain the inorganic structure 1 having excellent chemical stability and excellent reliability.

The inorganic substance constituting the inorganic particles 2 is particularly preferably an oxide. When the inorganic substance includes an oxide of a metallic element described above, it is possible to obtain the inorganic structure 1 having higher durability compared to the case of a fluoride or a nitride. Note that the oxide of the metallic element is preferably a compound in which only oxygen is bound to the metallic element. A specific example of the inorganic substance constituting the inorganic particles 2 can be aluminum oxide. A specific example of the inorganic particles 2 can be alumina particles. Since aluminum oxide has a high acid resistance and a high alkali resistance, the inorganic structure 1 can be obtained having high durability under acidic conditions or alkaline conditions.

It is preferable that the inorganic particles 2 be made from a simple metal oxide or a complex metal oxide and that the simple metal oxide contain one metallic element and the complex metal oxide contain two or more metallic elements. When the inorganic particles 2 include a simple metal oxide or a complex metal oxide of a metallic element described above, the obtained inorganic structure 1 becomes a ceramic that is stable and has various excellent properties. Note that the inorganic particles 2 preferably contain a simple metal oxide or a complex metal oxide as a main component. Specifically, the inorganic particles 2 preferably contain a simple metal oxide or a complex metal oxide at 80 mol % or more, more preferably 90 mol % or more, even more preferably 95 mol % or more.

Each of the multiple inorganic particles 2 is preferably crystalline. That is, it is preferable that the inorganic particles 2 include the above-described inorganic substance and the inorganic substance be crystalline. When the inorganic particles 2 include a crystalline inorganic substance, it is possible to obtain the inorganic structure 1 having higher durability compared to the case where an amorphous inorganic substance is included. Note that the inorganic particles 2 may be single crystal particles or polycrystalline particles.

The average particle size of the multiple inorganic particles 2 is 1 µm or more. When the average particle size of the inorganic particles 2 is within this range, the inorganic particles 2 are strongly bound to each other, and this can increase the strength of the inorganic structure 1. When the average particle size of the inorganic particles 2 is within this range, the percentage of pores present inside the inorganic structure 1 is 20% or less as described below, and this can increase the strength of the inorganic structure 1. The average particle size of the multiple inorganic particles 2 is preferably 5 µm or more, more preferably 10 µm or more. The average particle size of the multiple inorganic particles 2 is preferably 50 µm or less, more preferably 30 µm or less, even more preferably 25 µm or less, particularly preferably 20 μm or less. Note that in this description, unless otherwise noted, the "average particle size" is a value calculated as an average of the particle sizes observed in several to several tens of visual fields using observation means such as a scanning electron microscope (SEM) or a transmission electron microscope (TEM).

The shape of the inorganic particles 2 is not particularly limited and can be spherical, for example. The inorganic particles 2 may have a whisker shape (needle shape) or a scale shape. Particles having a whisker shape or a scale shape have a higher degree of contact with other particles and with the binding part 3 compared to the particles having a spherical shape, and this makes it possible to increase the strength of the entire inorganic structure 1.

The binding part 3 binds each of the multiple inorganic particles 2 together. Since adjacent inorganic particles 2 are bound through the binding part 3, the inorganic particles 2 are bound to each other in three dimensions, and thus it is possible to obtain a bulk body having high mechanical strength. The binding part 3 is preferably in direct contact with the inorganic particles 2. In addition, the binding part 3 covers at least part of the surface of each of the inorganic particles 2. It is preferable that the binding part 3 cover the entire surface of each of the inorganic particles 2. This causes the inorganic particles 2 and the binding part 3 to be firmly bound, and thus the inorganic structure 1 can be obtained having excellent density and mechanical strength.

The binding part 3 contains multiple fine particles 4 having an average particle size of 100 nm or less. Since the binding part 3 contains such multiple fine particles 4, the structure of the inorganic structure 1 is dense, and it becomes possible to enhance the strength of the inorganic structure 1. Note that the average particle size of the fine particles 4 may be 80 nm or less, 50 nm or less, or 30 nm or less. The average particle size of the fine particles 4 may be 1 nm or more, 5 nm or more, or 10 nm or more. The average particle size of the multiple fine particles 4 can be measured using a scanning electron microscope (SEM) or a transmission electron microscope (TEM) as described above.

The fine particles 4 may contain at least one oxide selected from the group consisting of aluminum oxide, titanium oxide, and a complex oxide of aluminum and titanium. Since these oxides have high acid resistance and high alkali resistance, the inorganic structure 1 can be obtained having high durability under acidic or alkaline conditions. An oxide contained in the fine particles 4 may be a crystalline compound or an amorphous compound. Note that it is preferable that the fine particles 4 contain aluminum oxide from the viewpoint of suppressing the occurrence of cracks originating from gaps between the inorganic particles 2 and the binding part 3.

Each of the multiple fine particles 4 is preferably crystalline. That is, it is preferable that the fine particles 4 contain the above-described inorganic substance and further be crystalline particles. When the inorganic particles 2 are crystalline particles, the inorganic structure 1 can be obtained having high durability compared with the case of amorphous particles. Note that the fine particles 4 may be single crystal particles or polycrystalline particles. The fine particles 4 may contain a crystal of at least one of γ alumina or η alumina. In addition, the fine particles 4 may contain a crystal of at least one of rutile-type titanium dioxide or anatase-type titanium dioxide.

The binding part 3 contains an amorphous compound containing at least one of aluminum or titanium, oxygen, and one or more metallic elements. A metallic element contained in the binding part 3 is a metallic element other than aluminum and titanium, and is at least one selected from the group consisting of an alkaline earth metal, a transition metal, a base metal, and a semimetal, for example. A metallic element contained in the binding part 3 may be zirconium.

It is preferable that each of the multiple fine particles 4 and the binding part 3 contain the same metallic element. For example, when the fine particles 4 contain aluminum, the binding part 3 preferably contains an amorphous compound containing aluminum. When the fine particles 4 contain titanium, the binding part 3 preferably contains an amorphous compound containing titanium. When the fine particles 4 contain aluminum and titanium, the binding part 3 preferably contains an amorphous compound containing aluminum and titanium.

It is preferable that the binding part 3 contain substantially no alkali metallic element, B, V, Te, P, Bi, Pb, and Zn. It is preferable that the binding part 3 contain substantially no Ca, Sr, and Ba. In this description, "the binding part contains substantially no alkali metallic element, B, V, Te, P, Bi, Pb, and Zn" means that the binding part 3 is not made to contain an alkali metallic element, B, V, Te, P, Bi, Pb, and Zn on purpose. Thus, when one or more of an alkali metallic element, B, V, Te, P, Bi, Pb, and Zn are mixed as unavoidable impurities in the binding part 3, the condition in which "the binding part contains substantially no alkali metallic element, B, V, Te, P, Bi, Pb, and Zn" is satisfied. In a similar manner, in this description, "the binding part contains substantially no Ca, Sr, and Ba" means that the binding part 3 is not made to contain Ca, Sr, and Ba on purpose. Thus, when one or more of Ca, Sr, and Ba are mixed as inevitable impurities in the binding part 3, the condition in which "the binding part contains substantially no Ca, Sr, and Ba" is satisfied.

In the inorganic structure 1, the volume percentage of the multiple inorganic particles 2 is 30% or more. Here, the obtained inorganic structure 1 is likely to utilize properties of the inorganic particles 2. Specifically, when the inorganic particles 2 contain an inorganic compound having a low thermal conductivity, the thermal insulation of the entire inorganic structure 1 can be improved. Conversely, when the inorganic particles 2 contain an inorganic compound having a high thermal conductivity, the thermal conductivity of the entire inorganic structure 1 can be improved. The volume percentage of the inorganic particles 2 is preferably larger than that of the binding part 3. In the inorganic structure 1, the volume percentage of the multiple inorganic particles 2 is preferably 50% or more.

Pores may exist in at least one place of inside the binding part 3 or between the binding part 3 and the inorganic particles 2. The porosity in the cross section of the inorganic structure 1 is preferably 20% or less. That is, when the cross section of the inorganic structure 1 is observed, the average value of the percentage of pores per unit area is preferably 20% or less. When the porosity is 20% or less, the percentage of the inorganic particles 2 being bonded to each other through the binding part 3 increases, and thus the inorganic structure 1 becomes denser and has increased strength. Thus, it becomes possible to improve the machinability of the inorganic structure 1. In addition, when the porosity is 20% or less, the occurrence of cracks originating from pores in the inorganic structure 1 is suppressed, and thus it becomes possible to increase the bending strength of the inorganic structure 1. Note that the porosity in the cross section of the inorganic structure 1 is preferably 10% or less, more preferably 8% or less, even more preferably 5% or less. The lower that the porosity is in the cross section of the inorganic structure 1, the more that cracks originating from pores are suppressed, and it becomes possible to increase the strength of the inorganic structure 1.

In this description, the porosity is determined as follows. First, a cross section of the inorganic structure 1 is observed to discriminate among the inorganic particles 2, the binding part 3, and pores. Then, the unit area and the area of the pores in that unit area are measured to obtain the percentage of the pores per unit area, which is defined as the porosity. Note that it is more preferable to obtain the percentage of pores per unit area at multiple points in a cross section of the inorganic structure 1 and then to define the average value of the percentage of the pores per unit area as the porosity. When a cross section of the inorganic structure 1 is observed, an optical microscope, a scanning electron microscope (SEM), and a transmission electron microscope (TEM) are usable. The unit area and the area of pores in that unit area may be measured through binarizing an image observed using a microscope.

The size of pores inside the inorganic structure 1 is not limited but is preferably as small as possible. When the size of pores is small, cracks originating from pores are prevented, which makes it possible to increase the strength of the inorganic structure 1 and to improve the machinability of the inorganic structure 1. Note that the size of pores in the inorganic structure 1 is preferably 5 μm or less, more preferably 1 μm or less, more preferably 100 nm or less. The size of pores inside the inorganic structure 1 is determined by observing a cross section of the inorganic structure 1 using a microscope in the same manner as the porosity described above.

It is sufficient for the inorganic structure 1 to have a structure in which the inorganic particles 2 are bound to each other through the binding part 3. Thus, as long as the inorganic structure 1 has such a structure, its shape is not limited. The inorganic structure 1 can have, for example, a plate shape, a film shape, a rectangular shape, a block-like shape, a rod shape, or a spherical shape. When the inorganic structure 1 has a plate shape or a film shape, its thickness is not limited but can be 100 μm or more, for example. The inorganic structure 1 according to the present embodiment is formed by using a pressure heating method as described below. It is thus possible to easily obtain the inorganic structure 1 having a large thickness. Note that the thickness of the inorganic structure 1 may be 500 μm or more, 1 mm or more, or 1 cm or more. The upper limit of the thickness for the inorganic structure 1 is not limited but can be 50 cm, for example.

In the inorganic structure 1, the multiple inorganic particles 2 are bound to each other through the binding part 3 and thus are not bound by an organic binder including an organic compound, nor by an inorganic binder other than the binding part 3. Thus, the inorganic structure 1 retains the characteristics of the inorganic particles 2 and the binding part 3. For example, when the inorganic particles 2 and the binding part 3 includes an inorganic material having high thermal conductivity, the obtained inorganic structure 1 also has excellent thermal conductivity. When the inorganic particles 2 and the binding part 3 includes an inorganic material having high electrical insulation, the obtained inorganic structure 1 also has excellent electrical insulation.

As described above, the inorganic structure 1 according to the present embodiment includes the multiple inorganic particles 2 and the binding part 3 that covers the surface of each of the inorganic particles 2 and binds each of the multiple inorganic particles 2 together.

The binding part 3 contains an amorphous compound that contains at least one of aluminum or titanium, oxygen, and one or more metallic elements, and contains multiple fine particles 4 having an average particle size of 100 nm or less. The average particle size of the multiple inorganic particles 2 is 1 μm or more. The volume percentage of the multiple inorganic particles 2 is 30% or more. In the inorganic structure 1, the multiple inorganic particles 2 are bound through the binding part 3 having high density. It is thus possible to obtain the inorganic structure 1 having excellent density and mechanical strength.

As illustrated in FIG. 1, the inorganic structure 1 according to the present embodiment can be a structure in which only the inorganic particles 2 are bound through the binding part 3. However, as described below, the inorganic structure 1 is obtained by being pressurized while being heated at a temperature of 50 to 300° C., which makes it possible to add a member having low heat resistance to the inorganic structure 1. Specifically, the inorganic structure 1 may contain organic matter or resin particles in addition to the inorganic particles 2 and the binding part 3. A member added to the inorganic structure 1 is not limited to one having low heat resistance, such as organic matter, and the inorganic structure 1 may include particles containing an inorganic compound other than inorganic particles 2 and the binding part 3.

[Method for Producing Inorganic Structure]

Figure 2:
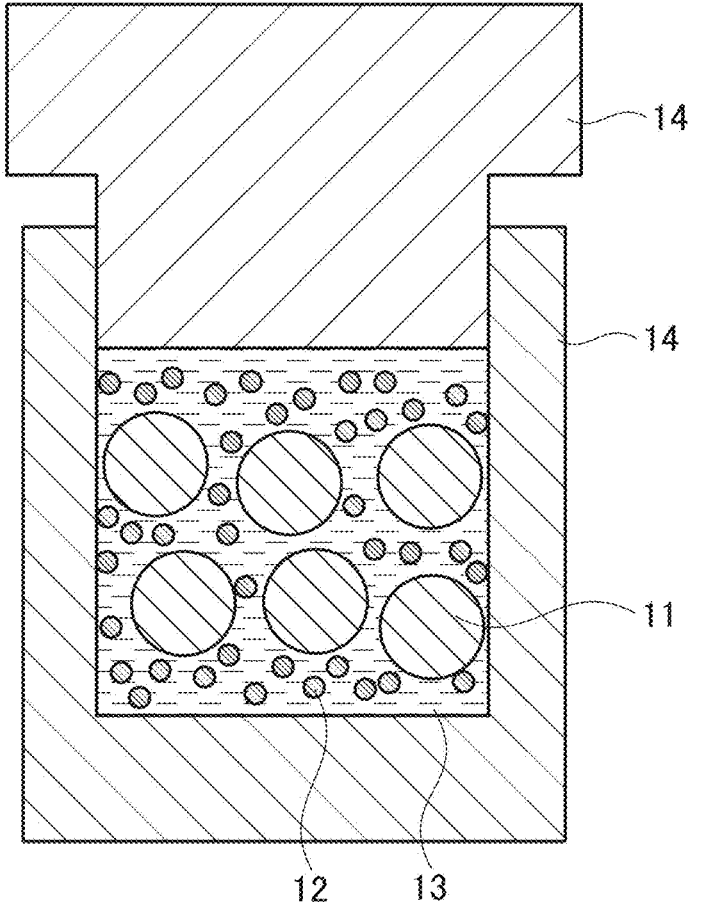
FIG. 2 is a schematic cross-sectional view for illustrating a method for producing the inorganic structure according to the present embodiment.

Next, a method for producing the inorganic structure 1 is described. As illustrated in FIG. 2, the method for producing the inorganic structure 1 includes a step for obtaining a mixture by mixing multiple inorganic particles 11, multiple fine particles 12, and an aqueous solution 13 containing a metallic element, and a step for pressurizing and heating the mixture.

Specifically, the mixture is first prepared by mixing a powder of the inorganic particles 11, a powder of the fine particles 12, and the aqueous solution 13 containing a metallic element. The inorganic particles 11 may be made from an inorganic substance similar to that of the inorganic particles 2 described above. The same average particle size as that of the multiple inorganic particles 2 described above can be adopted for the average particle size of the multiple inorganic particles 11, and is 1 μm or more. The volume percentage of the multiple inorganic particles 11 in the mixture is 30% or more, and is preferably 50% or more.

The fine particles 12 contain at least one oxide selected from the group consisting of aluminum oxide, titanium oxide, and a complex oxide of aluminum and titanium. An average particle size similar to that of the fine particles 4 described above can be adopted for the average particle size of the multiple fine particles, and is 100 nm or less. Specifically, the fine particles 12 contain at least one selected from the group consisting of aluminum oxide particles, titanium oxide particles, and complex oxide particles of aluminum and titanium. Alumina particles are particles containing aluminum oxide. Titania particles are particles containing titanium oxide. Complex oxide particles of aluminum and titanium are particles containing a complex oxide of aluminum and titanium.

The fine particles 12 are preferably fumed particles. That is, the aluminum oxide particles are preferably fumed alumina. Fumed alumina is constituted by particles produced through combustion hydrolysis of aluminum trichloride. The titanium oxide particles are preferably fumed titania. Fumed titania is constituted by particles produced through combustion hydrolysis of titanium tetrachloride. The complex oxide particles of aluminum and titanium are preferably fumed aluminum-titanium complex oxide. The fumed aluminum-titanium complex oxide is constituted by particles produced through combustion hydrolysis of aluminum trichloride and titanium tetrachloride. Fumed particles form bulky secondary particles through aggregation and agglomeration of primary particles. Fumed particles have an average particle size of about 5 to 50 nm, for example. Thus, fumed particles are highly reactive with the aqueous solution 13 and can easily form an amorphous compound containing at least one of aluminum or titanium, oxygen, and a metallic element.

The aqueous solution 13 containing a metallic element is an aqueous solution containing, as ions, a metallic element that can be contained in the binding part 3. A metallic element contained in the aqueous solution 13 is preferably at least one selected from the group consisting of an alkaline earth metal, a transition metal, a base metal, and a semimetal as described above. Note that a solvent for dissolving a metallic element is preferably pure water or ion exchange water. Note that in addition to water, the solvent may contain an acidic or alkaline substance. The solvent may contain an organic solvent, such as an alcohol.

Specifically, when the inorganic structure 1 with the binding part 3 containing an amorphous compound containing aluminum, oxygen, and zirconium is produced, aluminum oxide particles can be used as the fine particles 12, and a zirconium oxyacetate aqueous solution can be used as the aqueous solution 13. When the inorganic structure 1 with the binding part 3 containing an amorphous compound containing titanium, oxygen, and zirconium is produced, titanium oxide particles can be used as the fine particles 12, and a zirconium oxyacetate aqueous solution can be used as the aqueous solution 13. When the inorganic structure 1 with the binding part 3 containing an amorphous compound containing aluminum, titanium, oxygen, and zirconium is produced, complex oxide particles of aluminum and titanium can be used as the fine particles 12, and a zirconium oxyacetate aqueous solution can be used as the aqueous solution 13. When the inorganic structure 1 with the binding part 3 containing an amorphous compound containing aluminum, titanium, oxygen, and zirconium is produced, aluminum oxide particles and titanium oxide particles can be used as the fine particles 12, and a zirconium oxyacetate aqueous solution can be used as the aqueous solution 13.

Then, as illustrated in FIG. 2, the mixture obtained by mixing the inorganic particles 11, the fine particles 12, and the aqueous solution 13 is filled inside a die 14. After being filled with the mixture, the die 14 is heated as necessary. Then, by applying pressure to the mixture inside the die 14, the inside of the die 14 enters a high pressure state. At this time, since the fine particles 12 are highly reactive, the fine particles 12 and the aqueous solution 13 react. Then, by taking out the molded body from the inside of the die 14, the inorganic structure 1 can be obtained with the multiple inorganic particles 2 being bound to each other through the binding part 3.

The heating and pressurizing conditions for the mixture obtained by mixing the inorganic particles 11, the fine particles 12, and the aqueous solution 13 are not limited as long as the reaction of the fine particles 12 with the aqueous solution 13 proceeds. For example, it is preferable to pressurize the above-described mixture at a pressure of 10 to 600 MPa while heating at a temperature of 50 to 300° C. Note that the temperature for heating the mixture is more preferably 80 to 250° C., more preferably 100 to 200° C. The pressure for pressurizing the mixture is more preferably 50 to 600 MPa, even more preferably 200 to 600 MPa. The pressurizing time is preferably within a range from 1 to 360 minutes, more preferably 10 to 240 minutes.

Through the heating and pressurizing step described above, a part of the fine particles 12 react with the aqueous solution 13 to form the binding part 3 containing an amorphous compound containing at least one of aluminum or titanium, oxygen, and one or more metallic elements. The binding part 3 covers the surface of each of the multiple inorganic particles 2 to bind each of the multiple inorganic particles 2 together. A part of the fine particles 12 do not react with the aqueous solution 13 and remain as fine particles 4. Thus, the binding part 3 contains multiple fine particles having an average particle size of 100 nm or less.

In addition, since the average particle size of the fine particles 12 is at the nano level, they are filled among the inorganic particles 11 without gaps. Thus, the resulting binding part 3 has a dense structure and can firmly bind the inorganic particles 11 together.

Here, a possible method for forming an aggregate of inorganic particles is to press only powder of inorganic particles. However, even if the powder of inorganic particles is put into a die and pressurized at normal temperature, the inorganic particles are unlikely to react with each other, and it is difficult to firmly bind the particles together. Thus, the obtained compact has many pores and lacks mechanical strength.

Another possible method for forming an aggregate of inorganic particles is to press only powder of the inorganic particles to form a compact and then to sinter the compact at a high temperature (for example, 1700° C. or higher). However, even when a compact of inorganic particles is sintered at a high temperature, the obtained structure has many pores and lacks mechanical strength. When inorganic particles are sintered at a high temperature, precise temperature control is necessary, which increases the manufacturing cost.

In contrast, in the production method according to the present embodiment, a mixture obtained by mixing the inorganic particles 11, the fine particles 12, and the aqueous solution 13 is heated and pressurized, and thus it is possible to obtain a dense and strong structure. In the production method according to the present embodiment, the structure is obtained by being pressurized while being heated at the temperature of 50 to 300° C., which makes it possible to eliminate precise temperature control and to reduce the manufacturing cost.

As described above, the method for producing the inorganic structure 1 according to the present embodiment includes a step for obtaining a mixture by mixing the multiple inorganic particles 11, the multiple fine particles 12, and the aqueous solution 13 containing a metallic element. The production method further includes a step for pressurizing and heating the mixture under conditions of a pressure of 10 to 600 MPa and a temperature of 50 to 300° C. The multiple inorganic particles 11 have an average particle size of 1 μm or more. The multiple fine particles 12 contain at least one oxide selected from the group consisting of aluminum oxide, titanium oxide, and a complex oxide of aluminum and titanium, and have an average particle size of 100 nm or less. The volume percentage of the multiple inorganic particles 11 in the mixture is 30% or more. Thus, the production method according to the present embodiment is capable of producing the inorganic structure 1 having high density through a simple method.

[Member Provided with Inorganic Structure]

Next, a member provided with the inorganic structure 1 is described. As described above, the inorganic structure 1 can be formed into a plate shape having a large thickness and also has excellent chemical stability as it is dense. The inorganic structure 1 has high mechanical strength, and thus can be cut in the same manner as a general ceramic member and can undergo a surface treatment. Thus, the inorganic structure 1 can be suitably used as a building material. The building material is not limited, and possible examples include an exterior wall material (siding), a roof material, and the like. Road materials and outer groove materials are also possible examples of the building material.

It is also possible to suitably use the inorganic structure 1 as an electronic equipment material. Possible examples of the electronic equipment material include structural materials, heat-resistant materials, insulating materials, heat dissipation materials, heat insulating materials, sealing materials, circuit boards, and optical materials.

EXAMPLES

The present embodiment is described below in more detail with reference to examples and reference examples, but the present embodiment is not limited to these examples.
[Preparation of Test Samples]

Example 1

First, a powder of first alumina particles having an average particle size of about 20 μm (Advanced Alumina AA-18 manufactured by SUMITOMO CHEMICAL COMPANY, LIMITED) was prepared. Also, a powder of second alumina particles having an average particle size of about 15 nm (fumed alumina, AEROXIDE (registered trademark) Alu C manufactured by NIPPON AEROSIL CO., LTD.) was prepared. Then, a mixed powder was obtained by mixing 0.2 g of the first alumina powder and 0.2 g of the second alumina powder with acetone using an agate mortar and an agate pestle. Note that in this mixed powder, the volume percentage (vol %) of the first alumina powder and the second alumina powder was 50:50.

In addition, a 40% zirconium oxyacetate aqueous solution was obtained by dissolving 4 g of zirconium oxyacetate powder ($ZrO(CH_3COO)_2$ manufactured by Mitsuwa Chemical Co., Ltd.) in 6 ml of ion-exchanged water.

Next, the entire amount of the mixed powder was put in a cylindrical die (φ10 mm) for molding having an internal space. Then, 100 μl of the zirconium oxyacetate aqueous solution was added in the die for molding and was mixed using a plastic spatula.

The mixed powder containing the zirconium oxyacetate aqueous solution was then heated and pressurized under conditions of 200° C., 400 MPa, and 60 minutes. Thus, a cylindrical test sample according to the present example was obtained.

Reference Example 1

First, 0.3 g of the same second alumina powder as in example 1 was put in a cylindrical die ((10 mm) having an internal space. Then, 300 μl of the zirconium oxyacetate aqueous solution prepared in example 1 was added in the die and was mixed using a plastic spatula.

Then, the second alumina powder containing the zirconium oxyacetate aqueous solution was heated and pressurized under conditions of 200° C., 400 MPa, and 60 minutes, and a test sample containing no first alumina particles was obtained.

Reference Example 2

A test sample was prepared in the same manner as in reference example 1 except that a mixed powder containing a zirconium oxyacetate aqueous solution was heated and pressurized under conditions of 200° C., 400 MPa, and 240 minutes.
[Evaluation of Test Samples]

The test samples produced as described above were subjected to structure observation, elemental analysis, crystal structure analysis, observation of pores, and measurement of porosity.
(Structure Observation)

Figure 3:
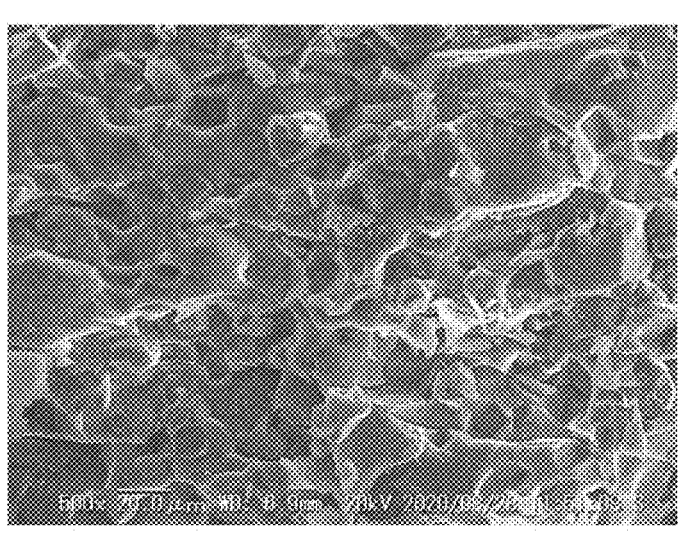
FIG. 3 is a scanning electron microscope (SEM) image of a test sample of example 1 magnified 500 times.
Figure 4:
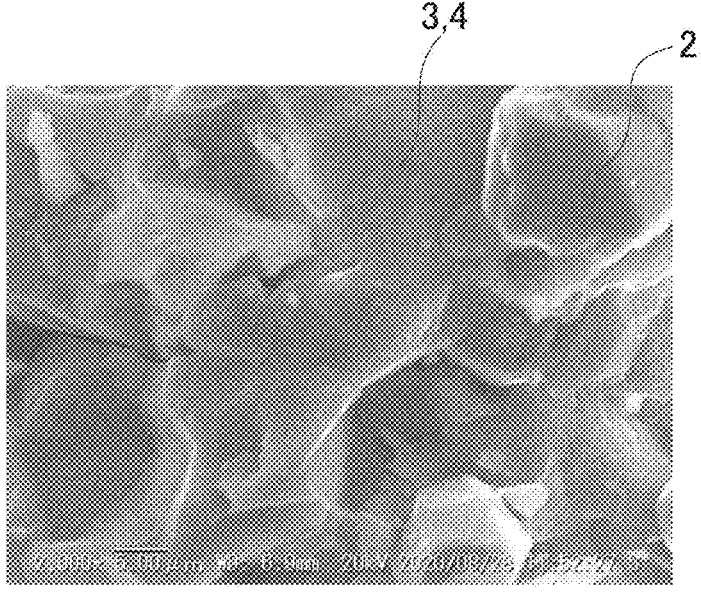
FIG. 4 is an SEM image of the test sample of example 1 magnified 2,000 times.
Figure 5:
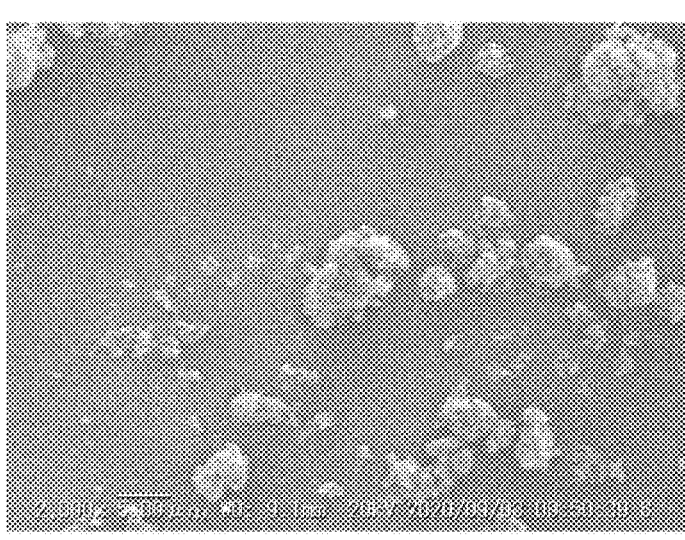
FIG. 5 is an SEM image of a second alumina powder magnified 2,000 times.
Figure 6:
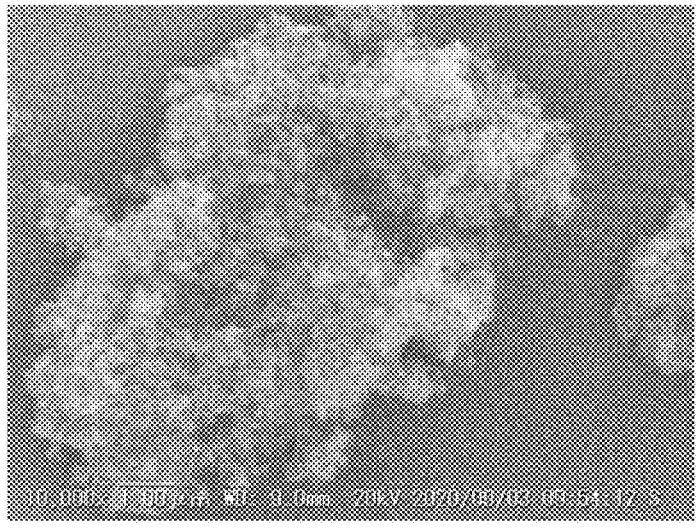
FIG. 6 is an SEM image of the second alumina powder magnified 10,000 times.
Figure 7:
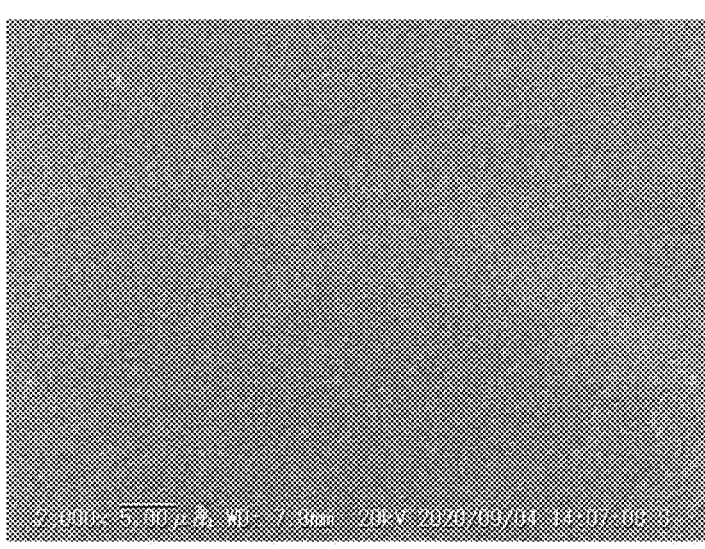
FIG. 7 is an SEM image of a test sample of reference example 1 magnified 2,000 times.
Figure 8:
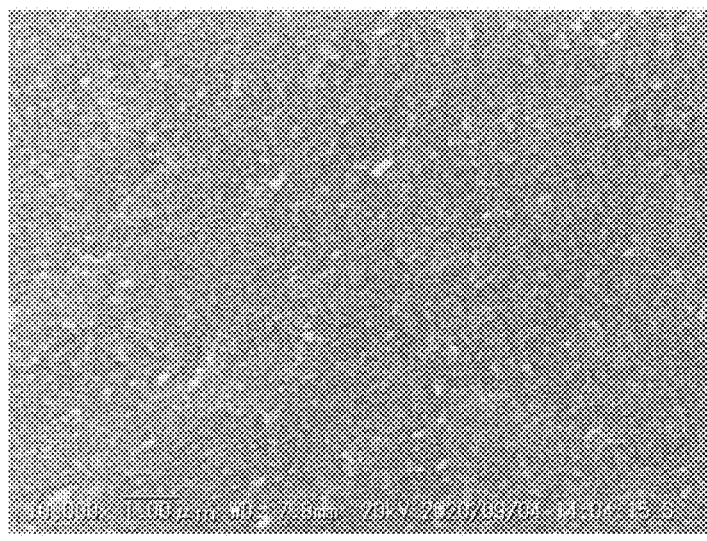
FIG. 8 is an SEM image of the test sample of reference example 1 magnified 10,000 times.

The cross section of a cut cylindrical test sample produced in example 1 was observed using a scanning electron microscope (SEM). Note that the observation surface of the test sample was sputtered with gold. FIG. 3 illustrates an SEM image of the test sample of example 1 magnified 500 times. FIG. 4 illustrates an SEM image of the test sample of example 1 magnified 2,000 times. For reference, FIG. 5 illustrates an SEM image of the second alumina powder magnified 2,000 times. FIG. 6 illustrates an SEM image of the second alumina powder magnified 10,000 times. FIG. 7 illustrates an SEM image of the test sample of reference example 1 magnified 2,000 times. FIG. 8 illustrates an SEM image of the test sample of reference example 1 magnified 10,000 times.

In the test sample of reference example 1 illustrated in FIGS. 7 and 8, fine particles 4 derived from the second alumina powder illustrated in FIGS. 5 and 6 can be seen bound to each other. From this, it is found that in the test sample of example 1 illustrated in FIGS. 3 and 4, the binding part 3 covers the surface of each of the first alumina particles (multiple inorganic particles 2) and binds each of the first alumina particles together.
(Elemental Analysis)

Figure 9:
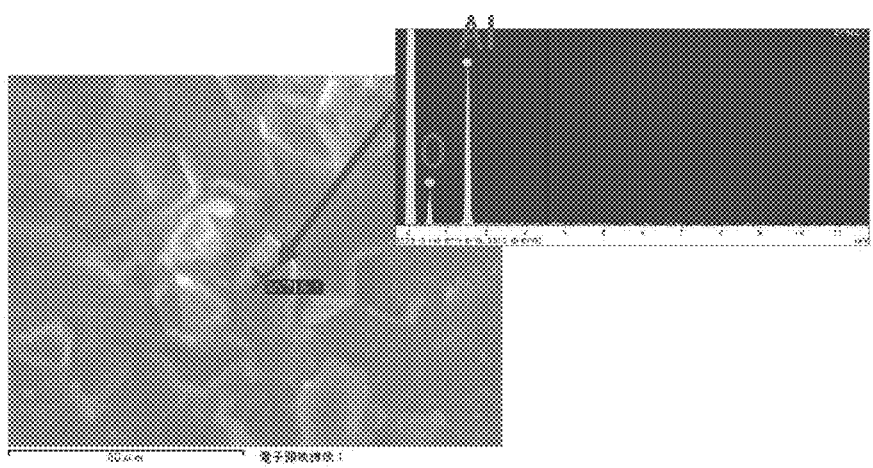
FIG. 9 is an EDX spectrum of a portion of the test sample of example 1 where particles are present.
Figure 10:
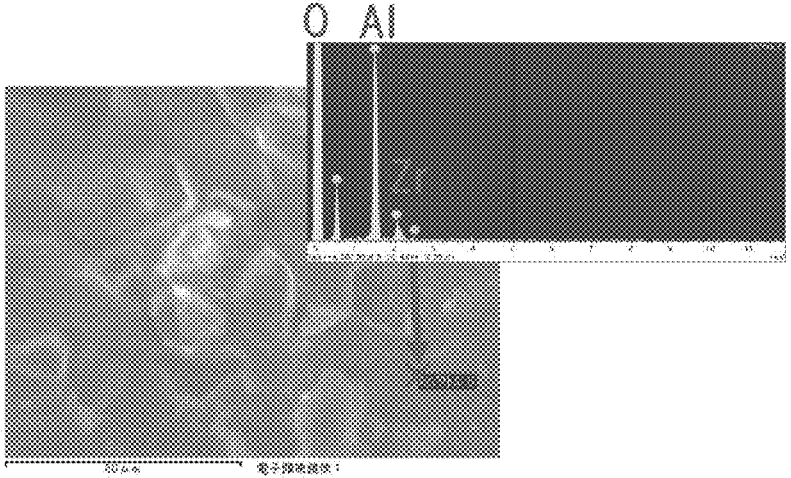
FIG. 10 is an EDX spectrum of a portion of the test sample of example 1 which binds particles together.
Figure 11:
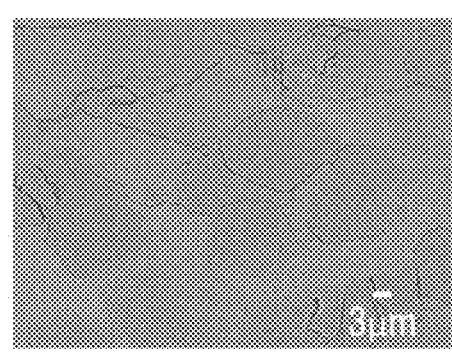
FIG. 11 is a diagram illustrating a result of a mapping analysis on the test sample of example 1.
Figure 11:
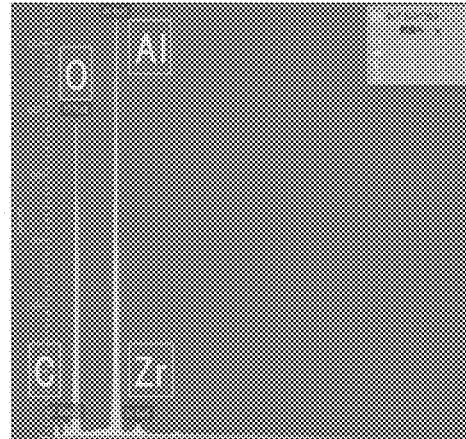
Figure 11:
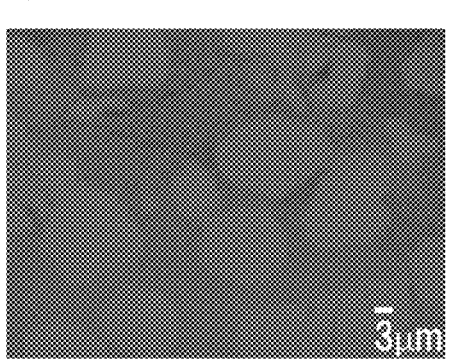
Figure 11:
Figure 11:
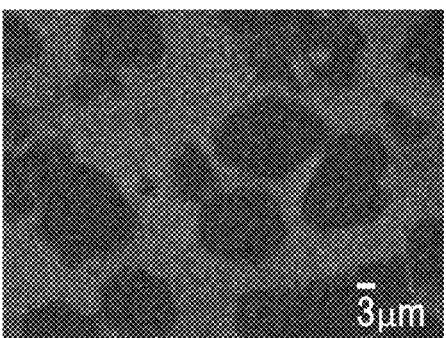
Figure 11:
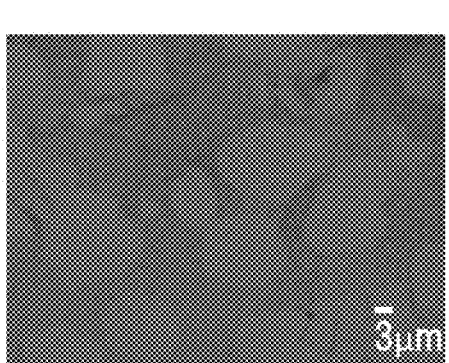
Figure 11:
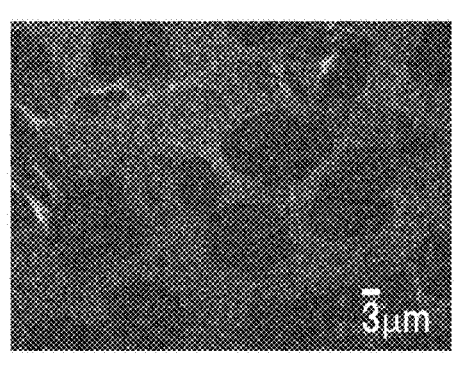
Figure 13:
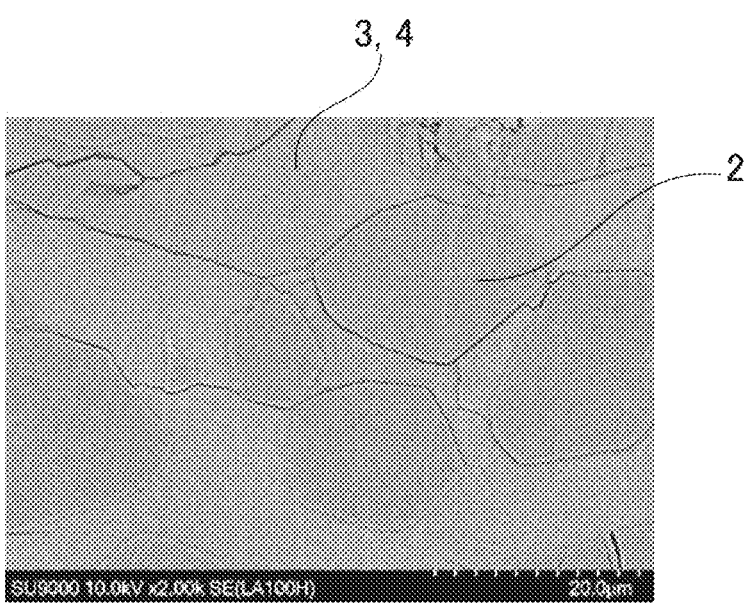
FIG. 13 is an SEM image of a cross section of the test sample of example 1 to which cross section polisher processing was applied and which was magnified 2,000 times.
Figure 14:
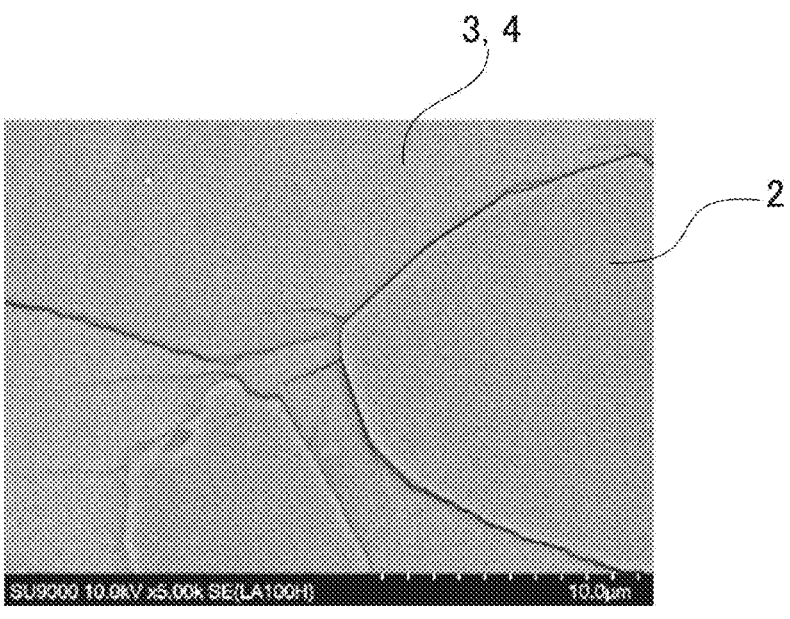
FIG. 14 is an SEM image of a cross section of the test sample of example 1 to which cross section polisher processing was applied and which was magnified 5,000 times.
Figure 15:
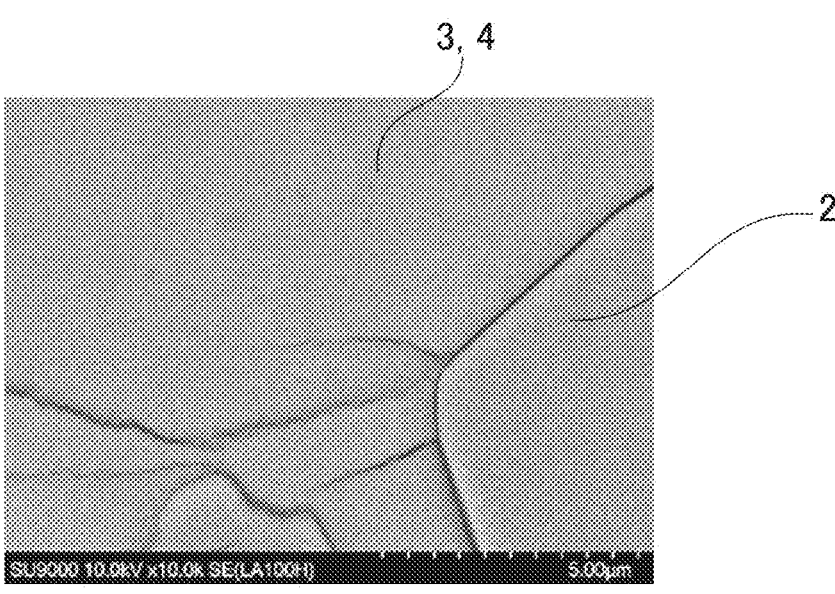
FIG. 15 is an SEM image of a cross section of the test sample of example 1 to which cross section polisher processing was applied and which was magnified 10,000 times.
Figure 16:
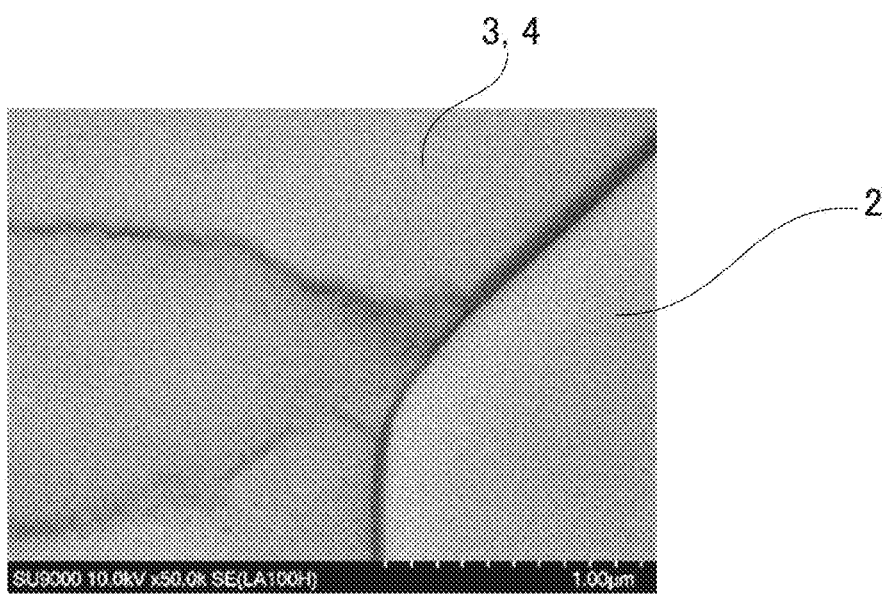
FIG. 16 is an SEM image of a cross section of the test sample of example 1 to which cross section polisher processing was applied and which was magnified 50,000 times.

The cross section of a cut cylindrical test sample produced in example 1 was observed using an energy dispersive X-ray spectroscopy (EDX). FIG. 9 illustrates an EDX spectrum of a portion of the test sample in example 1 where particles are present. FIG. 10 illustrates an EDX spectrum of a portion of the test sample in example 1 which binds particles together. FIG. 11 illustrates a result of a mapping analysis on the test sample of example 1.

From the EDX spectrum in FIG. 9 and the result of the mapping analysis in FIG. 11, it was confirmed that the portion where particles were present contained aluminum (Al) and oxygen (O) and thus was derived from the primary alumina particles (inorganic particles 2) constituting the raw material. In addition, from the EDX spectrum in FIG. 10 and the result of the mapping analysis in FIG. 11, the portion which binds particles together (binding part 3) contains aluminum (Al), zirconium (Zr), and oxygen (O), and Al, Zr, and O are uniformly dispersed. This suggests the existence of an Al—Zr—O based compound formed through the reaction between the second alumina particles (fine particle 4) and the zirconium oxyacetate aqueous solution as the raw material. Note that a minute amount of carbon (C) is present in the binding part 3, and it is considered to be an organic residue derived from the zirconium oxyacetate aqueous solution as the raw material.
(Crystal Structure Analysis)

Figure 12:
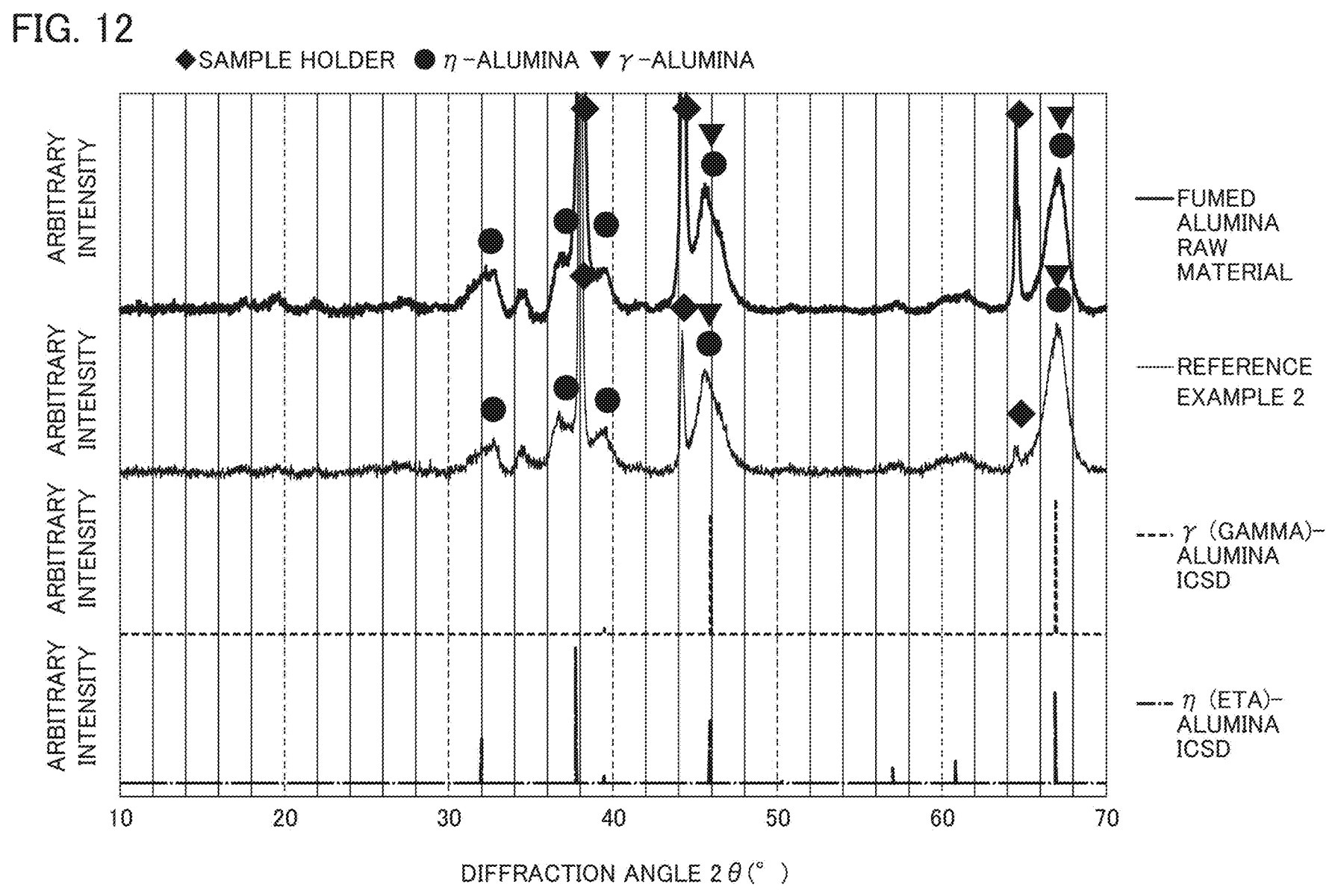

A powder X-ray diffraction (XRD) instrument was used to measure an XRD pattern of powder obtained by pulverizing the test sample of reference example 2. FIG. 12 illustrates the XRD pattern of the second alumina powder (fumed alumina) as the raw material, the XRD pattern of the test sample of reference example 2, and the XRD patterns of γ alumina or η alumina registered in the ICSD.

As illustrated in FIG. 12, peaks similar to those of the second alumina powder as the raw material were observed in the XRD pattern of the test sample of reference example 2. These peaks coincide with those included in the XRD patterns of α alumina and η alumina. From these results, it is considered that the binding part 3 contains crystals of α alumina and η alumina derived from the second alumina particles as the raw material and that at least a part of the second alumina particles do not react and remain as fine particles 4 having an average particle size of 100 nm or less.

Note that the same XRD pattern was obtained for the test sample of reference example 1 with the pressurizing time of 60 minutes, as for the test sample of reference example 2 with the pressurizing time of 240 minutes. This suggests that even when the pressurizing time is increased from 60 minutes to 240 minutes, the crystalline phase does not change significantly and fine particles 4 remain.

In addition, the XRD pattern of the test sample of reference example 2 does not exhibit a peak derived from zirconium. The test sample of reference example 2 does not contain the first alumina powder; however, the first alumina powder contains aluminum oxide as well as the second alumina powder, and thus the test sample of example 1 is expected to have an XRD pattern similar to that of reference example 2. Therefore, it is considered that the binding part 3 of the test sample of example 1 contains fine particles 4 and an amorphous compound containing Zr.

From the above-described elemental analysis, it was confirmed that the binding part 3 contained aluminum, oxygen, and zirconium. From the result of crystal structure analysis, the XRD pattern of the test sample of reference example 2 did not exhibit a peak derived from zirconium. From these results, it is considered that the binding part 3 contains an amorphous compound containing aluminum, oxygen, and zirconium.

(Observation of Pores)

First, cross section polisher processing (CP processing) was applied to the cross section of the cylindrical test sample of example 1. Then, a scanning electron microscope (SEM) was used to observe SEM images of the cross section of the test sample at magnifications of 2,000, 5,000, 10,000, and 50,000 times. FIGS. 13, 14, 15, and 16 illustrate SEM images of the cross section of the test sample of example 1 magnified 2,000, 5,000, 10,000, and 50,000 times, respectively.

From the SEM images in FIGS. 13 to 16, the test sample of example 1 had a gap between the inorganic particles 2 and the binding part 3, and a crack originating from the gap was seen. However, the test sample of example 1 did not have many pores as seen in the conventional compact obtained by pressing only the powder of inorganic particles, and it was confirmed that the test sample had a dense structure having few macropores.

(Measurement of Porosity)

Figure 17:
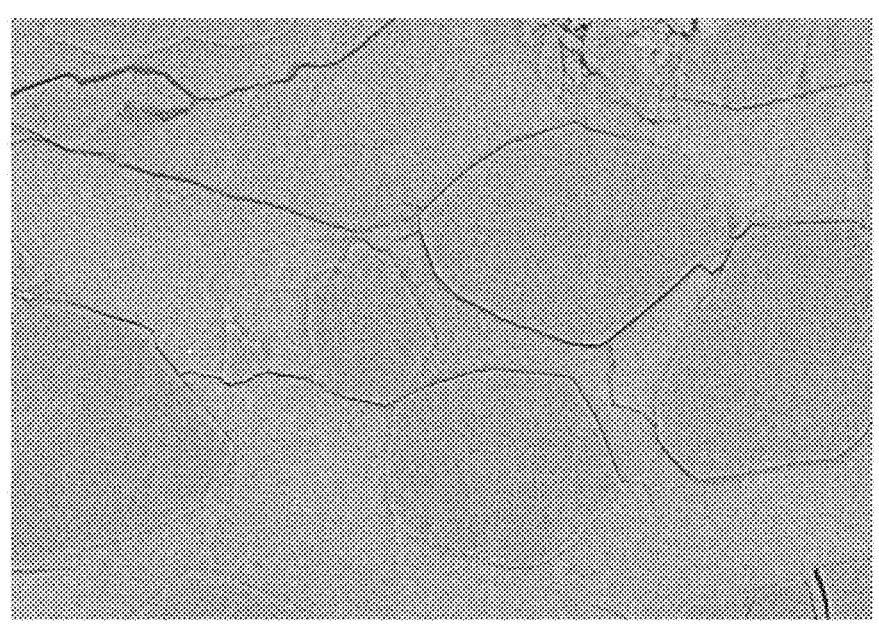
FIG. 17 is an SEM image of a cross section of the test sample of example 1 to which cross section polisher processing was applied and which was magnified 2,000 times.
Figure 18:
FIG. 18 is a binarized image of the SEM image of FIG. 17.

First, cross section polisher processing (CP processing) was applied to the cross section of the cylindrical test sample of example 1. Then, a scanning electron microscope (SEM) was used to observe the SEM image of the cross section of the test sample at a magnification of 2,000 times. The SEM image obtained by observing the cross section of the test sample is illustrated in FIG. 17. Next, the pore portion was clarified by binarizing the obtained SEM image. Then, the area percentage of the pore portion was calculated from the binarized image to obtain the porosity. The binarized image of the SEM image in FIG. 17 is illustrated in FIG. 18. Note that black parts of the binarized image are pores.

The porosity was calculated from the binarized image in FIG. 18, and the porosity was 4.3%. The porosity was also calculated in the same manner as above for two points different from FIG. 18. As a result, the average value of the porosity at the three points was 3.2%, and a very small porosity value was obtained.

[Preparation of Test Samples]

Example 2

First, a powder of first alumina particles having an average particle size of about 20 μm (Advanced Alumina AA-18 manufactured by SUMITOMO CHEMICAL COMPANY, LIMITED) was prepared. Also, a powder of second titania particles having an average particle size of about 20 nm (fumed titania, AEROXIDE (registered trademark) $TiO_2$ P25 manufactured by NIPPON AEROSIL CO., LTD.) was prepared. Then, a mixed powder was obtained by mixing 0.197 g of the first alumina powder and 0.203 g of the titania powder with acetone using an agate mortar and an agate pestle. Note that in the mixed powder, the volume percentage (vol %) of the first alumina powder and the titania powder was 50:50.

In addition, an aqueous solution of 40% zirconium oxyacetate was obtained by dissolving 4 g of zirconium oxyacetate powder $(ZrO(CH_3COO)_2$ manufactured by Mitsuwa Chemical Co., Ltd.) in 6 ml of ion-exchanged water.

Next, the entire amount of the mixed powder was put in a cylindrical die (φ10 mm) for molding having an internal space. Then, 150 μl of the zirconium oxyacetate aqueous solution was added in the die for molding and was mixed using a plastic spatula.

The mixed powder containing the zirconium oxyacetate aqueous solution was then heated and pressurized under conditions of 200° C., 400 MPa, and 30 minutes. Thus, a cylindrical test sample according to the present example was obtained.

Reference Example 3

First, 0.3 g of the same titania powder as in example 2 was put in a cylindrical die (φ10 mm) having an internal space. Then, 150 μl of the zirconium oxyacetate aqueous solution prepared in example 2 was added in the die and was mixed using a plastic spatula.

Then, the titania powder containing the zirconium oxyacetate aqueous solution was heated and pressurized under conditions of 200° C., 400 MPa, and 30 minutes, and a test sample containing no first alumina particles was obtained.

[Evaluation of the Test Samples]

The test samples produced as described above were subjected to structure observation, elemental analysis, crystal structure analysis, observation of pores, and measurement of porosity.

(Structure Observation)

Figures 19, 20:
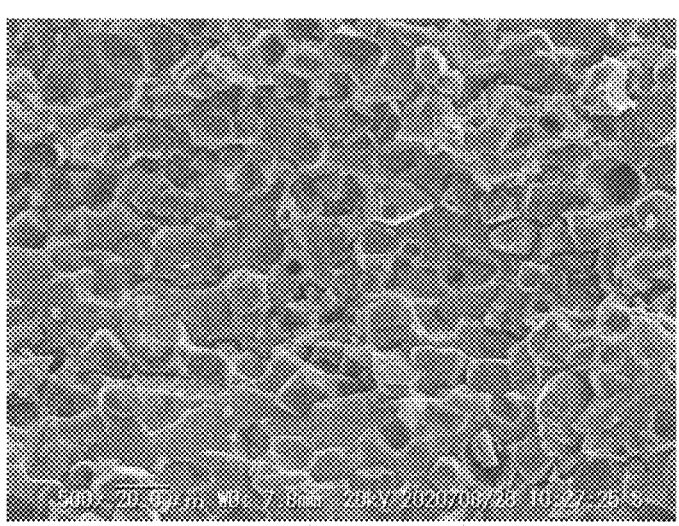
FIG. 19 is an SEM image of a test sample of example 2 magnified 500 times.
FIG. 20 is an SEM image of a test sample of example 2 magnified 2,000 times.
Figure 21:
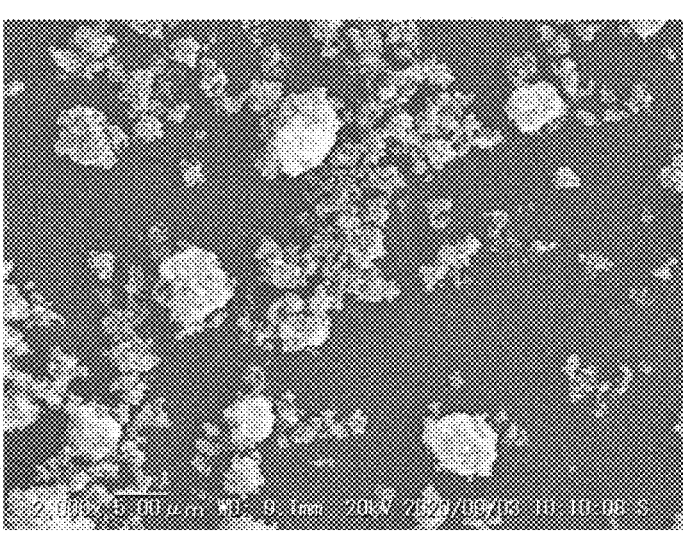
FIG. 21 is an SEM image of a titania powder magnified 2,000 times.
Figure 22:
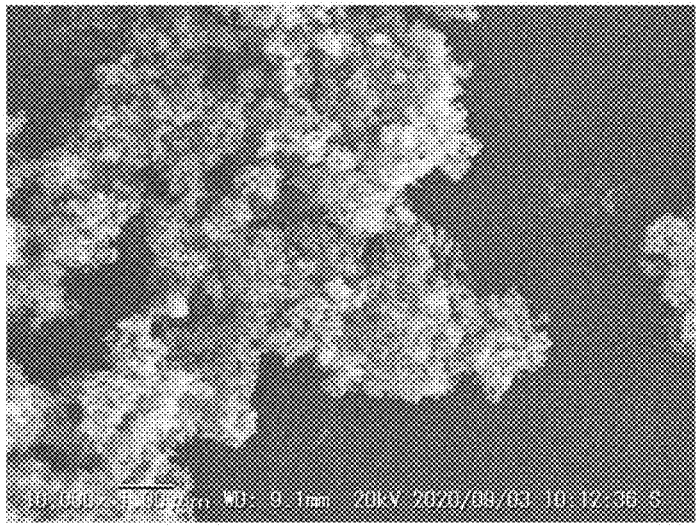
FIG. 22 is an SEM image of a titania powder magnified 10,000 times.
Figure 23:
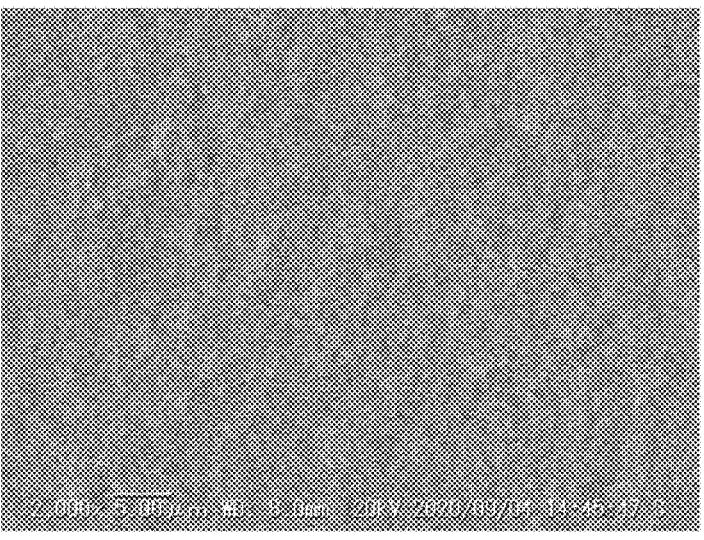
FIG. 23 is an SEM image of a test sample of reference example 3 magnified 2,000 times.
Figure 24:
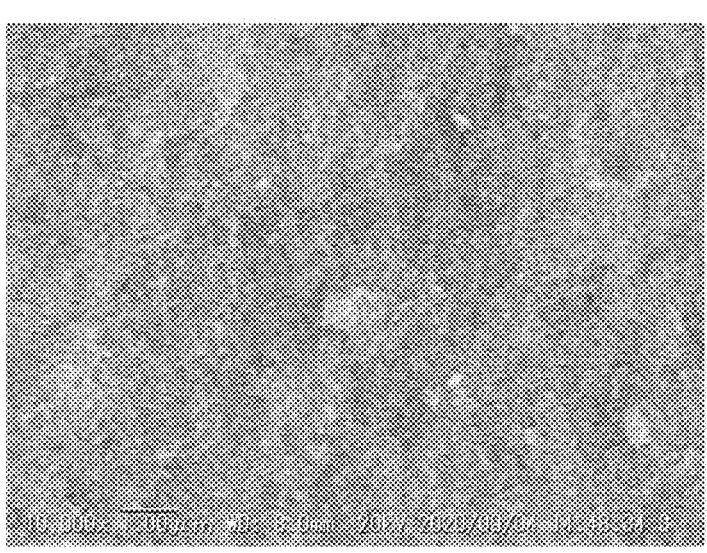
FIG. 24 is an SEM image of a test sample of reference example 3 magnified 10,000 times.

The cross section of a cut cylindrical test sample produced in example 2 was observed using a scanning electron microscope (SEM). Note that the observation surface of the test sample was sputtered with gold. FIG. 19 illustrates an SEM image of the test sample of example 2 magnified 500 times. FIG. 20 illustrates an SEM image of the test sample of example 2 magnified 2,000 times. For reference, FIG. 21 illustrates an SEM image of titania powder magnified 2,000 times. FIG. 22 illustrates an SEM image of titania powder magnified 10,000 times. FIG. 23 illustrates an SEM image of the test sample of reference example 3 magnified 2,000 times. FIG. 24 illustrates an SEM image of the test sample of reference example 3 magnified 10,000 times.

In the test sample of reference example 3 illustrated in FIGS. 23 and 24, fine particles 4 derived from the titania powder illustrated in FIGS. 21 and 22 can be seen bound to each other. From this, it is found that in the test sample of example 2 illustrated in FIGS. 19 and 20, the binding part 3 covers the surface of each of the first alumina particles (multiple inorganic particles 2) and binds each of the first alumina particles together.

(Elemental Analysis)

Figure 25:
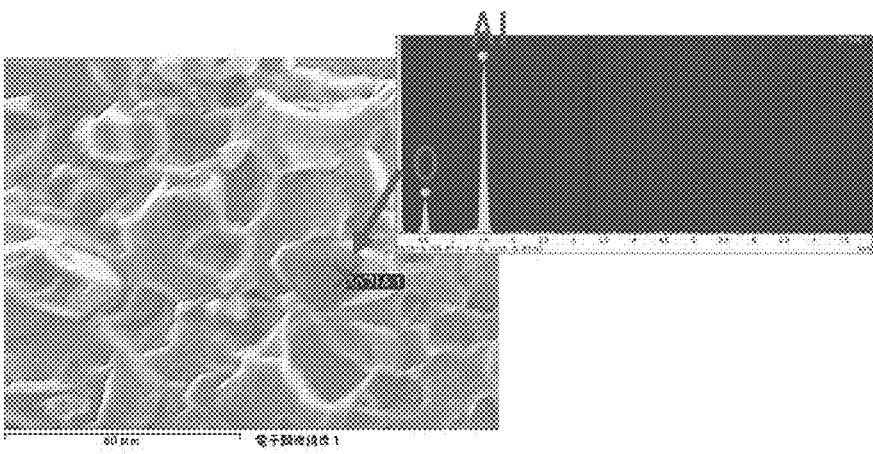
FIG. 25 is an EDX spectrum of a portion of the test sample of example 2 where particles are present.
Figure 26:
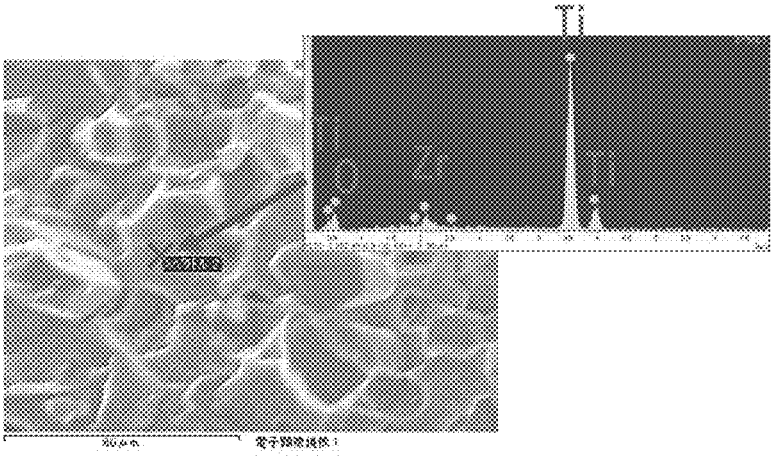
FIG. 26 is an EDX spectrum of a portion of the test sample of example 2 which binds particles together.
Figure 27:
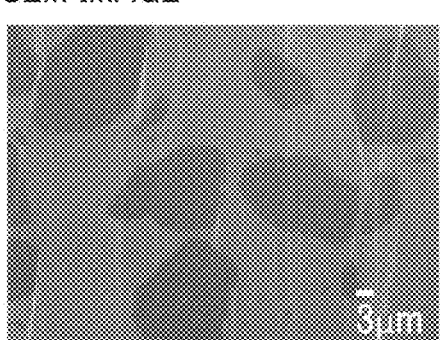
FIG. 27 is a diagram illustrating a result of a mapping analysis on the test sample of example 2.
Figure 27:
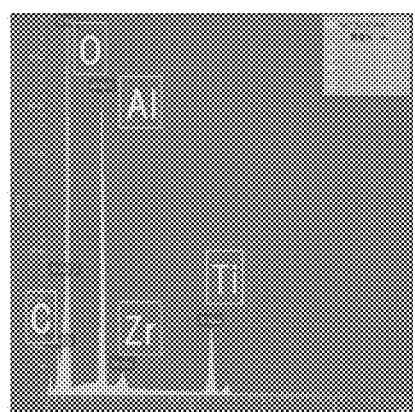
Figure 27:
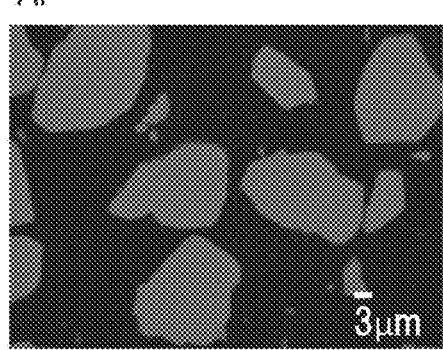
Figure 27:
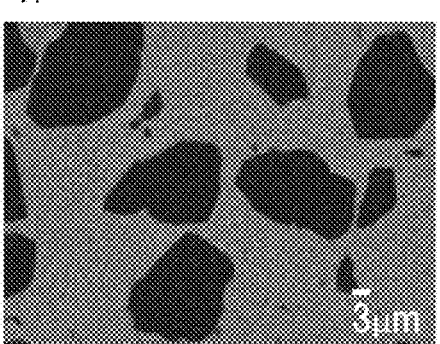
Figure 27:
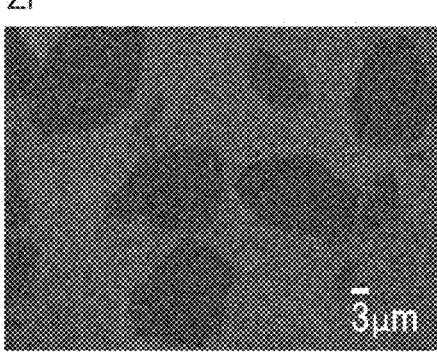
Figure 27:
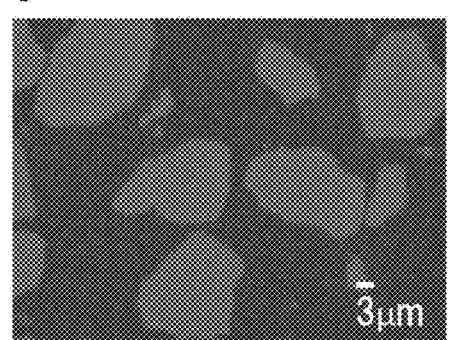
Figure 27:
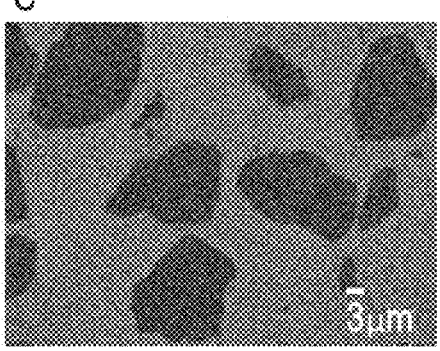

The cross section of a cylindrical test sample produced in example 2 was observed using an energy dispersive X-ray spectroscopy (EDX). FIG. 25 illustrates an EDX spectrum of a portion of the test sample in example 2 where particles are present. FIG. 26 illustrates an EDX spectrum of a portion of the test sample in example 2 which binds particles together. FIG. 27 illustrates a result of a mapping analysis on the test sample of example 2.

From the EDX spectrum in FIG. 25 and the result of the mapping analysis in FIG. 27, it was confirmed that the portion where particles were present contained aluminum (Al) and oxygen (O) and thus was derived from the primary alumina particles (inorganic particles 2) as the raw material. In addition, from the EDX spectrum in FIG. 26 and the result of the mapping analysis in FIG. 27, the portion which binds particles together (binding part 3) contains titanium (Ti), zirconium (Zr), and oxygen (O), and Ti, Zr, and O are uniformly dispersed. This suggests the existence of a Ti—Zr—O based compound formed through the reaction between the second titania particles (fine particles 4) and the zirconium oxyacetate aqueous solution as the raw material. Note that a minute amount of C is present in the binding part 3, and it is considered to be an organic residue derived from the zirconium oxyacetate aqueous solution as the raw material.

(Crystal Structure Analysis)

Figure 28:
FIG. 28 illustrates an XRD pattern of the titania powder (fumed titania) as a raw material, an XRD pattern of a test sample of reference example 3, and XRD patterns of rutile-type $TiO_2$ and anatase-type $TiO_2$ registered in the ICSD.
Figure 29:
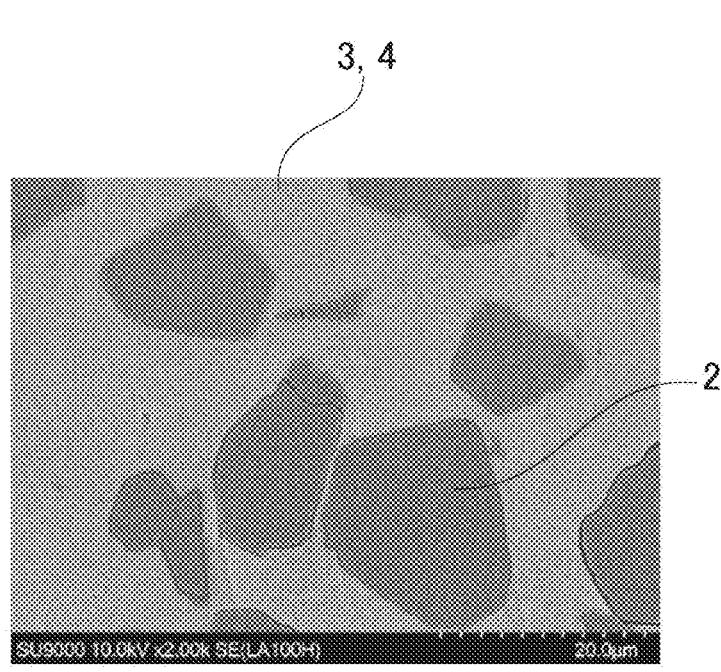
FIG. 29 is an SEM image of a cross section of the test sample of example 2 to which cross section polisher processing was applied and which was magnified 2,000 times.
Figure 30:
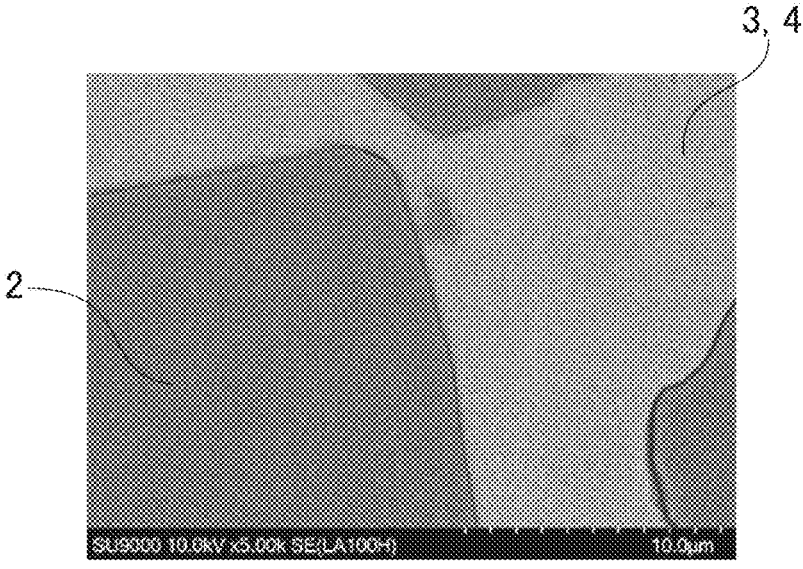
FIG. 30 is an SEM image of a cross section of the test sample of example 2 to which cross section polisher processing was applied and which was magnified 5,000 times.
Figure 31:
FIG. 31 is an SEM image of a cross section of the test sample of example 2 to which cross section polisher processing was applied and which was magnified 10,000 times.
Figure 32:
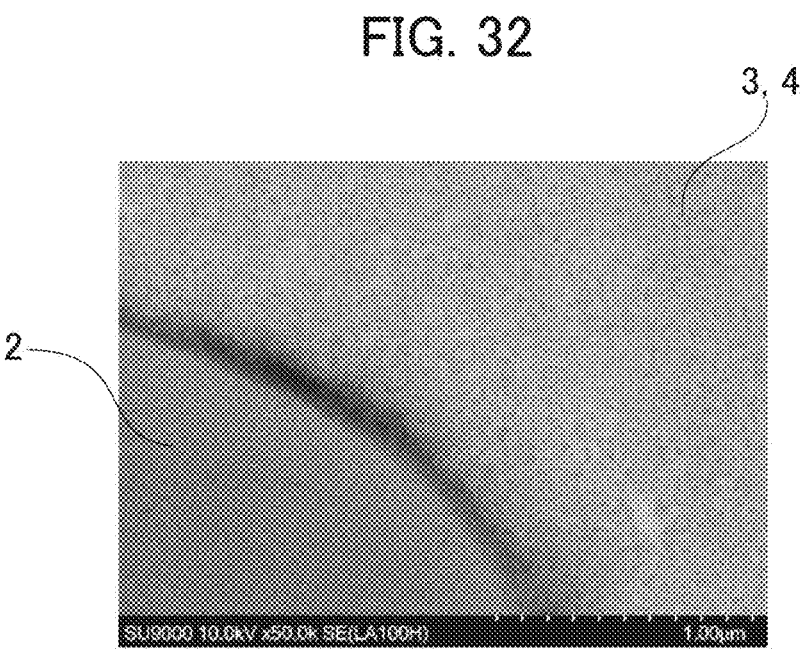
FIG. 32 is an SEM image of a cross section of the test sample of example 2 to which cross section polisher processing was applied and which was magnified 50,000 times.

A powder X-ray diffraction (XRD) instrument was used to measure an XRD pattern of powder obtained by pulverizing the test sample of reference example 3. FIG. 28 illustrates the XRD pattern of the titania powder (fumed titania) as the raw material, the XRD pattern of the test sample of reference example 3, and the XRD patterns of rutile-type $TiO_2$ and anatase-type $TiO_2$ registered in the ICSD.

As illustrated in FIG. 28, peaks similar to those of the titania powder as the raw material were observed in the XRD pattern of the test sample of reference example 3. These peaks coincide with those included in the XRD patterns of rutile-type $TiO_2$ and anatase-type $TiO_2$. From these results, it is considered that the binding part 3 contains crystals of rutile-type $TiO_2$ and anatase-type $TiO_2$ derived from the second titania particles as the raw material and that at least a part of the second titania particles do not react and remain as the fine particles 4 having an average particle size of 100 nm or less.

In addition, the XRD pattern of the test sample of reference example 3 does not exhibit a peak derived from zirconium. From the result of the elemental analysis described above, it was confirmed that the binding part 3 contained almost no aluminum. From these results, it is considered that the binding part 3 contains an amorphous compound including titanium, oxygen, and zirconium.

(Observation of Pores)

First, cross section polisher processing (CP processing) was applied to the cross section of the cylindrical test sample of example 2. Then, a scanning electron microscope (SEM)

was used to observe SEM images of the cross section of the test sample at magnifications of 2,000, 5,000, 10,000, and 50,000 times. FIGS. 29, 30, 31, and 32 illustrate SEM images of the cross section of the test sample of example 2 magnified 2,000, 5,000, 10,000, and 50,000 times, respectively.

From the SEM images in FIGS. 29 to 32, the test sample of example 2 had a gap between the inorganic particles 2 and the binding part 3. However, the test sample of example 2 did not have many pores as seen in the conventional compact obtained by pressing only the powder of inorganic particles, and it was confirmed that the test sample had a dense structure having few macropores. Also, the test sample of example 2 exhibited few cracks originating from the gap between the inorganic particles 2 and the binding part 3 as seen in the test sample of example 1.

(Porosity Measurement)

Figure 33:
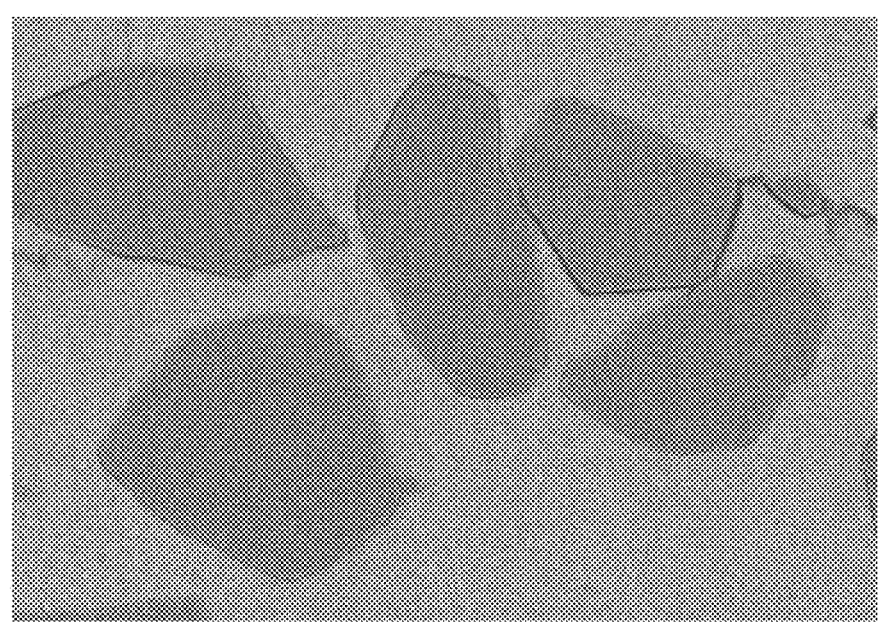
FIG. 33 is an SEM image of a cross section of the test sample of example 2 to which cross section polisher processing was applied and which was magnified 2,000 times.
Figure 34:
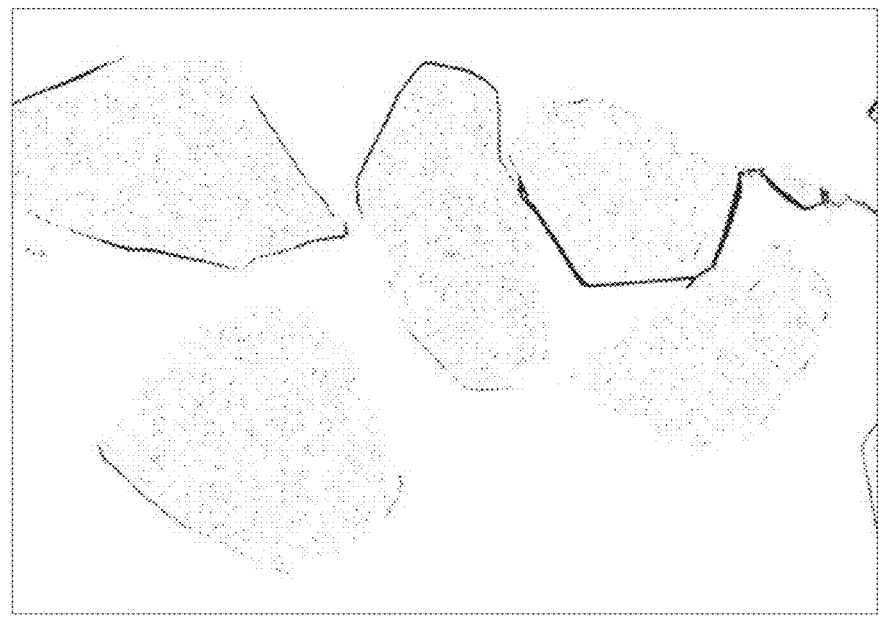
FIG. 34 is a binarized image of the SEM image of FIG. 33.

First, cross section polisher processing (CP processing) was applied to the cross section of the test sample of the example 2, which is cylindrical. Then, using a scanning electron microscope (SEM), an SEM image was observed at a magnification of 2,000 times on the cross section of the test sample. The SEM image obtained by observing the cross section of the test sample is illustrated in FIG. 33. Next, the pore portion was clarified by binarizing the obtained SEM image. The binarized image of the SEM image in FIG. 33 is illustrated in FIG. 34. Then, the area percentage of the pore portion was calculated from the binarized image to obtain the porosity. Note that black parts of the binarized image are pores.

The porosity was calculated from the binarized image in FIG. 34, the porosity was 1.1%. The porosity was also calculated in the same manner as above for two points different from FIG. 34. As a result, the average value of the porosity at the three points was 1.7%, and a very small porosity value was obtained.

Note that fumed alumina was used as the fine particles 4 in example 1, and fumed titania was used as the fine particles 4 in example 2 to produce the inorganic structure 1. However, even when fumed aluminum-titanium complex oxide is used as the fine particles 4, it is considered that an inorganic structure 1 that is the same as with fumed alumina and with fumed titania can be obtained.

The entire contents of Japanese Patent Application No. 2021-021639 (filed Feb. 15, 2021) are incorporated herein by reference.

Although the present embodiment has been described above, the present embodiment is not limited to these descriptions, and various modifications are possible within the scope of the gist according to the present embodiment.

INDUSTRIAL APPLICABILITY

The present disclosure makes it possible to provide an inorganic structure that can be prepared through a simple method and has even higher density, and a method for producing the inorganic structure.

REFERENCE SIGNS LIST

1 Inorganic structure
2 Inorganic particles
3 Binding part
4 Fine particles
11 Inorganic particles
12 Fine particles
13 Aqueous solution containing a metallic element

The invention claimed is:

1. An inorganic structure, comprising:

a plurality of inorganic particles; and a binding part that covers a surface of each of the plurality of inorganic particles and binds each of the plurality of inorganic particles together, wherein the binding part contains: an amorphous compound containing at least one of aluminum or titanium, oxygen, and one or more metallic elements; and a plurality of fine particles having an average particle size of 100 nm or less, the plurality of inorganic particles has an average particle size of 1 μm or more, the plurality of inorganic particles has a volume percentage of 30% or more, and an inorganic substance constituting the inorganic particles is at least one selected from the group consisting of an oxide of a metallic element, a nitride of a metallic element, a hydroxide of a metallic element, an oxide hydroxide of a metallic element, a sulfide of a metallic element, a boride of a metallic element, a carbide of a metallic element, and a halide of a metallic element.

2. The inorganic structure according to claim 1, wherein the binding part contains substantially no alkali metallic element, B, V, Te, P, Bi, Pb, and Zn.

3. The inorganic structure according to claim 1, wherein the binding part contains substantially no Ca, Sr, and Ba.

4. The inorganic structure according to claim 1, wherein each of the plurality of fine particles and the amorphous compound contained in the binding part contain the same metallic element.

5. The inorganic structure according to claim 1, wherein the plurality of inorganic particles has a volume percentage of 50% or more.

6. The inorganic structure according to claim 1, wherein the inorganic structure has a porosity of 20% or less.

7. The inorganic structure according to claim 1, wherein each of the plurality of inorganic particles is crystalline.

8. The inorganic structure according to claim 1, wherein the inorganic structure has a thickness of 100 μm or more.

9. A method for producing an inorganic structure, comprising:

a step for obtaining a mixture by mixing: a plurality of inorganic particles having an average particle size of 1 μm or more; a plurality of fine particles that contains at least one oxide selected from the group consisting of aluminum oxide, titanium oxide, and a complex oxide of aluminum and titanium, and has an average particle size of 100 nm or less; and an aqueous solution containing a metallic element; and a step for pressurizing and heating the mixture under conditions of a pressure of 10 to 600 MPa and a temperature of 50 to 300° C., wherein the plurality of inorganic particles has a volume percentage of 30% or more in the mixture.

10. The inorganic structure according to claim 1, wherein the inorganic particles include aluminum oxide.

11. The inorganic structure according to claim 1, wherein the amorphous compound contains aluminum.

12. The inorganic structure according to claim 1, wherein the amorphous compound contains titanium.

13. The inorganic structure according to claim 1, wherein the fine particles contain at least one oxide selected from the group consisting of aluminum oxide, titanium oxide, and a complex oxide of aluminum and titanium.

* * * * *